Patented Nov. 1, 1932

1,886,311

UNITED STATES PATENT OFFICE

SIEGFRIED SKRAUP, OF WURZBURG, KARL SCHÖLLKOPF, OF DUSSELDORF-OBERKASSEL, AND ARTHUR SERINI, OF DUSSELDORF-HEERDT, GERMANY, ASSIGNORS TO RHEINISCHE KAMPFER-FABRIK GESELLSCHAFT MIT BESCHRANKTER HAFTUNG, OF DUSSELDORF-OBERKASSEL, GERMANY

PROCESS FOR PREPARING THYMOL

No Drawing. Application filed June 30, 1928, Serial No. 289,612, and in Germany July 11, 1927.

The present invention relates to a process for preparing thymol by combining propylene with m-cresol.

We have discovered the surprising fact that propylene and m-cresol may be caused to combine to form propyl or isopropyl derivatives of m-cresol by simply heating them together to fairly high temperatures under pressure. The reaction conditions can be so chosen that the main product of the combination of propylene and m-cresol is thymol (3-hydroxy-1-methyl-4-isopropyl-benzene). Temperatures from about 300° C. to 400° C. are with advantage employed. The pressure at which the combination of the propylene with the m-cresol is effected must be higher than the vapour pressure or the decomposition pressure of the reaction product at the temperature employed. Molecular proportions of propylene and m-cresol are, in general, employed. An excess of m-cresol represses, and an excess of propylene promotes, the formation of multiple propylated addition products.

We have further found that the condensation of propylene with m-cresol as described above, may be effected in a technically more simple manner, with the aid of catalysts, as the temperature, the pressure and the reaction period are decreased thereby. The combination of the propylene with m-cresol can in this way be effected at normal pressure and even at reduced pressure. A large number of substances of the most varied kinds can be employed as catalysts for the reaction in question. The usual condensing agents and substances which bring about the splitting off of water are particularly suitable, for example, inorganic and organic acids and their derivatives, for example, sulphuric acid, hydrochloric acid, the various phosphoric acids, sulphonic acids, phosphoric anhydride, phosphoric acid chloride and the like.

Metal oxides, for example, aluminum oxide, thorium oxide, tungstic oxide and the like.

Metal salts, for example, zinc chloride, aluminum chloride, ferric chloride, magnesium chloride, potassium bisulphate, potash alum, aluminum sulphate, aluminum phosphate, aluminum silicate, other metallic silicates and the like.

Contact substances, for example, active charcoal, silica gels, kieselguhr, kaolin, clay, fuller's earths, bleaching earths, siliceous earths and the hydrosilicates obtained from the above-mentioned silicates by the action of acids and the like.

The catalysts may be employed in several different ways, either alone or mixed with one another or deposited on carriers, which may consist of any of the above-mentioned contact substances or of other substances, for example, pumice stone, barium sulphate and the like.

The action of the catalysts on the condensation varies. The temperature, pressure and period of reaction have, therefore, to be varied according to the catalytic action. The examples illustrate the preferred method of procedure for individual cases.

The reaction product obtained in the described condensation of propylene with m-cresol with and without the aid of catalysts is subjected to fractional distillation in order to separate the thymol from the by-products.

The first fractions coming over consist of unchanged m-cresol and, according to the reaction conditions, an isomer of thymol (3-hydroxy-1-methyl-2-isopropyl-benzene) having a melting point of 69° C. and a boiling point of 228° C. to 229° C. From the middle and main fraction of the fractional distillation thymol, having a boiling point of 232° C. and a melting point of 51° C., is obtained. The next fractions yield an isomer of thymol (3-hydroxy-1-methyl-6-isopropyl-benzene) of melting point 114° C. and boiling point 245° C. to 246° C. and also di-propyl-or-isopropyl-m-cresols having a boiling point of about 265° C. According to the reaction conditions derivatives of m-cresol propylated at the oxygen atom, for example, isopropyl-m-cresyl ether of boiling point 196° C. to 197° C., and the higher boiling isopropyl-thymol ether and higher propylated m-cresol ethers are obtained. If these ethers should be present they are separated in known manner from the phenol mixture by treating the reaction product with dilute caustic-alkalies and the phenol mixture subjected to fractional distillation.

By correctly regulating the reaction thymol is obtained as the main product and the by-products mentioned only in subordinate quantities, as is shown in the following examples:—

1. 108 parts by weight of m-cresol are heated in a pressure apparatus, such as a pressure tube, autoclave or the like, with 35–40 parts by weight of propylene under a pressure of about 30 to 40 atmospheres at a temperature of about 330° C. to 350° C. for 20–40 hours. The reaction product is then fractionally distilled and the thymol boiling at 232° C. separated and recrystallized from benzine. A pure product having a melting point of 51° C. is obtained. Taking into consideration the m-cresol recovered during the distillation, thymol is obtained in a yield of 50–60% of the m-cresol reacted upon.

2. m-cresol vapour is passed together with propylene at normal or reduced pressure over a catalyst at about 150° C. to 350° C. The contact substance or catalyst may, for example, be aluminum oxide, which is shaped or pressed into pieces whilst in a moist condition and then dried. As catalyst there may also be employed, thorium oxide mounted on pumice, aluminum phosphate or aluminum hydroxide deposited on kieselguhr, active charcoal containing phosphoric acid or zinc chloride, brick clay, fuller's earths or one of the activated bleaching earths used in commerce, preferably in the form of pieces about the size of a bean. The speed at which the reacting substances are passed through one of the usual contact apparatus is so regulated that as high a yield of thymol as possible is obtained. The rate of passage also depends on the nature of the catalyst employed, the length and volume of the contact space and the reaction temperature. The amount of propylene passed through apparatus is such that an excess of propylene leaves the apparatus together with the condensation product. Any alkali-insoluble ethers (isopropyl-m-cresyl ether and isopropyl-thymol ether and higher propylated m-cresyl ethers) present are separated from the condensation product by treating the latter with dilute caustic soda. On acidifying the alkaline solution an ether-free phenol mixture is obtained. The latter or the ether-free condensation product is fractionally distilled. About 60% of the m-cresol employed is recovered in the first fraction. A small fraction can be collected from which the isomer of thymol having a melting point of 69° C. and a boiling point of from 228° C. to 229 C. separates out. The next and larger fraction contains the thymol having a boiling point of 232° C., which separates out on cooling and which can be obtained pure with a melting point of 51° C. by crystallization from benzine.

The isomer of thymol having a melting point of 114° C. and a boiling point of 245° C.–246° C. crystallizes out from the final fraction. The residue—an oil boiling at about 265° C.—consists of a mixture of various di-propyl- or -isopropyl m-cresols. The yield in thymol amounts to about 50% to 60% of the m-cresol reacted.

3. 108 parts by weight of m-cresol are treated in an autoclave with 35 to 40 parts by weight of propylene at a pressure of about 5 to 30 atmospheres and a temperature of about 180° C. to 230° C. for about 15 to 25 hours with stirring in the presence of about 10 parts by weight of a catalyst. About 100% sulphuric acid or the m-cresol sulphonic acid formed from the sulphuric acid and the m-cresol or anhydrous zinc chloride, or phosphoric anhydride or about 100% phosphoric acid or an activated bleaching earth may be, for example, employed as the catalyst. The reaction product is separated from the catalyst by steam distillation, by suctional filtration, by centrifuging or shaking out with water and is then fractionally distilled whereby the thymol and the by-products are obtained as in Example 2 in the different fractions.

In the following further example it will now be shown that with the aid of a few of the catalysts mentioned a condensation of the substances mentioned may be effected at temperatures of about 100° C. and even lower. It was, however, found that in this case the combination or condensation of propylene with m-cresol is effected in such a manner that the by-products mentioned are chiefly obtained and thymol scarcely formed or only formed in small quantities. If, however, in this case the treatment after the condensation is continued at higher temperatures or if the condensation is carried out at a higher temperature from the start for a sufficiently long time a maximum yield of thymol is obtained.

4. 108 parts by weight of m-cresol are condensed with 35 to 40 parts by weight of propylene in the presence of about 10 parts by weight of catalysts, for example, about 100% sulphuric acid at a temperature of about 80° C. to 100° C. and a pressure of 2 to 10 atmospheres with stirring for several hours. On working up the reaction product according to Examples 2 and 3 the by-products of thymol preponderate and only small quantities of thymol are formed. If, however, the condensation product is further heated to about 220° C. for about 20 hours with stirring, thymol forms the main product.

What we claim is:—

1. A process for preparing thymol (3-hydroxy-1-methyl-4-isopropyl-benzene) which consists in causing propylene to react with m-cresol at temperatures from 100° to 400° C.

and subjecting the reaction product obtained to fractional distillation.

2. A process for preparing thymol which consists in causing propylene to react with m-cresol at temperatures from 100° to 400° C. and increased pressure and subjecting the reaction product obtained to fractional distillation.

3. A process for preparing thymol which consists in causing propylene to react with m-cresol at temperatures from 100° to 400° C. in the presence of condensing and dehydrating catalysts and subjecting the reaction product obtained to fractional distillation.

4. A process for preparing thymol which consists in causing propylene to react with m-cresol at temperatures from 100° to 400° C. and increased pressure in the presence of condensing and dehydrating catalysts and subjecting the reaction product obtained to fractional distillation.

5. A process for preparing thymol which consists in causing propylene to react with m-cresol at temperatures from 100° to 400° C. and increased pressure in the presence of acidic condensing and dehydrating catalysts and subjecting the reaction product obtained to fractional distillation.

6. A process for preparing thymol which consists in causing propylene to react with m-cresol at temperatures from 100° to 400° C., treating the condensation product with dilute caustic alkalis, separating the alkali-insoluble ethers from the alkaline solution, acidifying the alkaline solution and subjecting the phenol mixture thus obtained to fractional distillation.

In testimony whereof we have signed our names to this specification.

SIEGFRIED SKRAUP.
KARL SCHÖLLKOPF.
ARTHUR SERINI.